(12) United States Patent
Racic

(10) Patent No.: US 11,444,660 B2
(45) Date of Patent: Sep. 13, 2022

(54) DATA TRANSMISSION DEVICE, DATA RECEPTION DEVICE AND DATA TRANSMISSION SYSTEM

(71) Applicant: SAFRAN AEROTECHNICS, Plaisir (FR)

(72) Inventor: Zoran Racic, Paris (FR)

(73) Assignee: SAFRAN AEROTECHNICS, Plaisir (FR)

(*) Notice: Subject to any disclaimer, the term of this patent is extended or adjusted under 35 U.S.C. 154(b) by 0 days.

(21) Appl. No.: 17/045,071

(22) PCT Filed: Apr. 4, 2019

(86) PCT No.: PCT/FR2019/050792
§ 371 (c)(1),
(2) Date: Oct. 2, 2020

(87) PCT Pub. No.: WO2019/193291
PCT Pub. Date: Oct. 10, 2019

(65) Prior Publication Data
US 2021/0152215 A1    May 20, 2021

Related U.S. Application Data

(60) Provisional application No. 62/652,538, filed on Apr. 4, 2018.

(30) Foreign Application Priority Data

Jul. 13, 2018  (FR) ...................................... 1856510
Oct. 25, 2018  (FR) ...................................... 1859890

(51) Int. Cl.
*H04B 3/56*     (2006.01)
*H04L 27/00*    (2006.01)
*H04B 3/54*     (2006.01)

(52) U.S. Cl.
CPC ........... *H04B 3/56* (2013.01); *H04L 27/0002* (2013.01); *H04B 3/542* (2013.01)

(58) Field of Classification Search
CPC ........ H04B 3/56; H04B 3/542; H04L 27/0002
See application file for complete search history.

(56) References Cited

U.S. PATENT DOCUMENTS 6,104,707 A  *  8/2000  Abraham .......... H02J 13/00009
                                              370/295
6,192,069 B1    2/2001  Kubinec
(Continued)

FOREIGN PATENT DOCUMENTS

FR        2937199 A1    4/2010

OTHER PUBLICATIONS

International Search Report dated Jul. 5, 2019, issued in corresponding International Application No. PCT/FR2019/050792, filed Apr. 4, 2019, 3 pages.
(Continued)

*Primary Examiner* — David S Huang
(74) *Attorney, Agent, or Firm* — Christensen O'Connor Johnson Kindness PLLC

(57) ABSTRACT

An emitting device includes: an oscillator configured for generating at least one carrier wave; an emitter including: at least one input connected to the oscillator; an activation input configured for receiving a signal representative of data to be transmitted; at least one output configured to generate a carrier wave modulated by the signal representative of the data to be transmitted; a communication link connected to the output of the emitter; a power line connected to the communication link at a connection point; a capacitive coupling component connected between the output of the emitter and the connection point. A receiving device and a system for transmission are also described.

8 Claims, 3 Drawing Sheets

(56) References Cited

U.S. PATENT DOCUMENTS

| | | | |
|---|---|---|---|
| 2004/0258141 A1 | 12/2004 | Tustison et al. | |
| 2012/0011388 A1* | 1/2012 | Katou | H04B 3/54 |
| | | | 713/340 |
| 2013/0121427 A1* | 5/2013 | Sun | H04B 3/54 |
| | | | 375/257 |
| 2017/0327242 A1* | 11/2017 | Lopez | H02M 1/44 |

OTHER PUBLICATIONS

Written Opinion of the International Searching Authority dated Jul. 5, 2019, issued in corresponding International Application No. PCT/FR2019/050792, filed Apr. 4, 2019, 6 pages.

Grassi, F., et al., "Effects of imbalance on conducted immunity of a PLC link onto a DC power-bus for spacecraft," 2015 Asia-Pacific Symposium on Electromagnetic Compatibility (AP EMC), IEEE, May 26, 2015, Abstract, 2 pages.

Larhzaoui, T., et al., "OFDM PLC transmission for aircraft flight control system," 18th IEEE International Symposium on Power Line Communications and Its Applications, IEEE, Mar. 30, 2014, 6 pages.

* cited by examiner

DATA TRANSMISSION DEVICE, DATA
RECEPTION DEVICE AND DATA
TRANSMISSION SYSTEM

FIELD OF THE DISCLOSURE

Embodiments of the present disclosure relate to the field of data transmission systems for aircraft.

BACKGROUND

Aircraft comprise a power distribution network and a data transmission network independent of the power distribution network.

FIG. 1 shows an example of a power transmission system 2 and a data transmission system 4 generally mounted in an aircraft. The power transmission system 2 is independent of the data transmission system 4.

The data transmission system 2 comprises a first emitter-receiver 6 and a second emitter-receiver 8 and a cable 10 connecting the first emitter-receiver 6 to the second emitter-receiver 8. The cable 10 comprises two strands 12, 14. Each emitter-receiver 6, 8 comprises an input 16, 18 connected to a processing unit 20, 22 for receiving data to be transmitted, an output 24, 26 connected to the processing unit 20, 22 for transmitting the data received and two inputs-outputs 28, 30, 32, 34 connected to the strands 12, 14 of the cable.

The power-transmission system 4 comprises a first cable 38 and a second cable 40 connected, on the one hand, to a voltage supply source 36 for the aircraft and, on the other hand, to a power conversion unit 42 or to electrical equipment. The first cable 38 is for example connected to a 28 V voltage. The second cable is connected to a ground.

The electrical cables are costly and considerably increase the mass of the aircraft and also the complexity of the connection harnesses.

Consequently, aircraft makers want to reduce the number of electrical cables in the aircraft since the electrical devices are more and more numerous.

For this purpose, sending data by multiplexing is known.

Further, sending data over cables is known in some domestic applications. Just the same, the systems used in domestic applications are not deterministic and therefore cannot be used in an aircraft because of aeronautic standards.

SUMMARY

The goal of the present disclosure is to reduce the number and weight of electrical cables in an aircraft.

For that purpose, a goal of the present disclosure is an emitting device suited for emitting data, where the emitting device comprises:
- an oscillator suited for generating at least one carrier wave;
- an emitter comprising:
  - at least one input connected to the oscillator;
  - an activation input intended to receive an activation signal; where the activation input is suited for receiving a signal representative of data to be transmitted;
  - at least one output able to generate a carrier wave modulated by the signal representative of the data to be transmitted,
- a communication link connected to the output of the emitter;
- at least one power line connected to the communication link at a connection point;
- at least one capacitive coupling component connected between the output of the emitter and the connection point, where the capacitive coupling component is suited for sending the modulated carrier wave and blocking the transmission of the supply voltage.

Advantageously, the capacitive coupling components and the data transmission mode by a modulated carrier wave allow transmitting power and data on the same communication link. The result of this is a considerable reduction of the number of electrical wires in the aircraft and also a simplification of the connection harness for the electrical wires.

Advantageously, this emitting device serves to send a quantity of power limited only by the cable type used.

Advantageously, this emitting device can be used with any type of protocol.

According to the specific embodiments, the emitting device comprises one or more of the following characteristics:
- wherein the emitter comprises a supplemental outlet; the device further comprising:
  - a supplemental communication link connected to the supplemental output;
  - a supplemental power line connected to the supplemental communication link at a supplemental connection point,
- the emitting device comprises at least one supplemental capacitive coupling component connected between the supplemental output of the emitter and the supplemental connection point;
- the emitter is suited for generating the modulated carrier wave in a differential mode at the output and at the supplemental output;
- the emitting device further comprises a processing unit having an output suited for generating a signal representative of data to be transmitted, where the output is connected to the activation input of the emitter;
- the emitting device comprises a filter connected to the power line, where the filter is suited for blocking the transmission of the modulated carrier wave;
- the filter is a transformer;
- the emitting device further comprises a voltage supply source connected to the power line;
- the emitting device further comprises electrical equipment connected to the power line.

An object of the present disclosure is a receiving device suited for receiving data, where the receiving device comprises:
- a receiver comprising an input suited for receiving a carrier wave modulated by a signal representative of data;
- a communication link connected to the input of the receiver, where the communication link is intended to be brought to a supply voltage and to transmit the modulated carrier wave;
- at least one power line connected to the communication link at a connection point;
- at least one capacitive coupling component connected between the input of the receiver and the connection point, where the capacitive coupling component is suited for sending the modulated carrier wave and blocking the transmission of the supply voltage.

According to the specific embodiments, the receiving device comprises one or more of the following characteristics:
- the receiver comprises a supplemental input; the receiving device further comprising:

a supplemental communication link connected to the supplemental input;

a supplemental power line connected to the supplemental communication link at a supplemental connection point;

at least one supplemental capacitive coupling component connected between the supplemental input of the receiver and the supplemental connection point, where the supplemental capacitive coupling component is suited for sending the modulated carrier wave and blocking the transmission of the supply voltage, the receiving device further comprises a filter connected to the power line, where the filter is suited for blocking the modulated carrier wave;

the receiving device further comprises a voltage supply source connected to the power line;

the receiving device further comprises electrical equipment connected to the power line.

Finally, an object of the present disclosure is a system for data and power transmission comprising an emitting device as mentioned above and a receiving device comprising a receiver comprising an input connected to the communication link, where the receiver is suited for receiving a carrier wave modulated by a signal representative of data;

at least one power line connected to the communication link at a connection point;

at least one capacitive coupling component connected between the input of the receiver and the connection point, where the capacitive coupling component is suited for sending the modulated carrier wave and blocking the transmission of the supply voltage.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
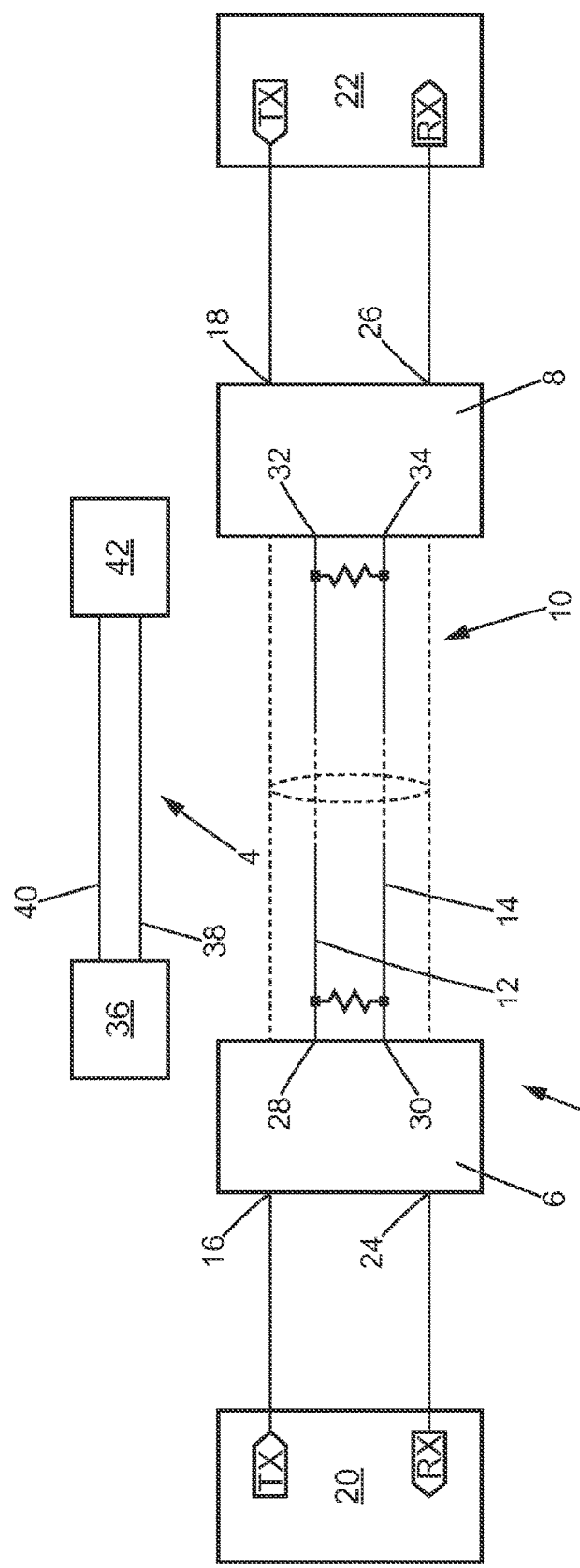
FIG. 1 is a view of a sample data transmission system and a power transmission system belonging to the state-of-the-art.
Figure 2:
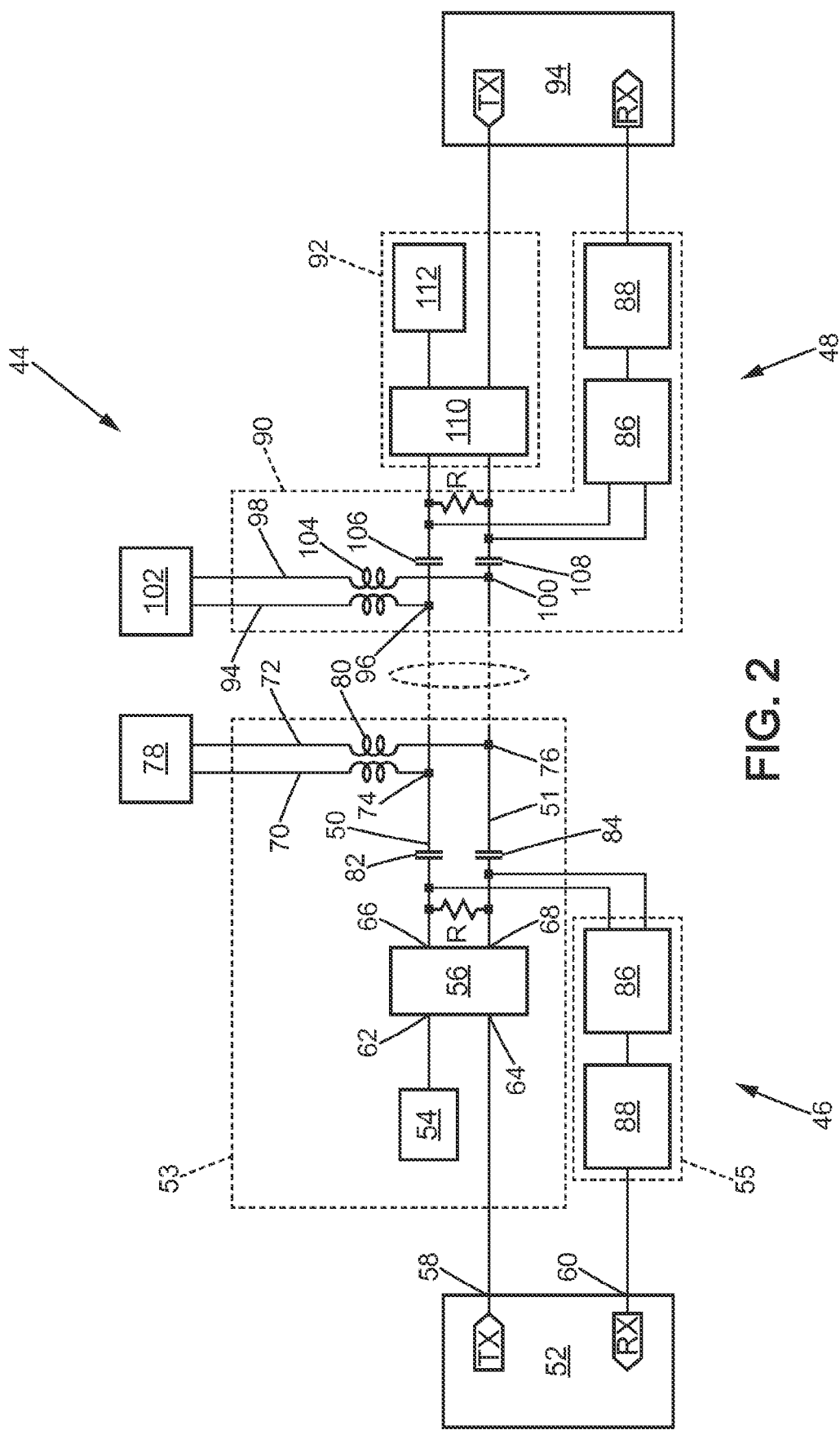
FIG. 2 is a schematic view of a data and power transmission system according to a first embodiment of the disclosure.

Referring to FIG. 2, the data and power transmission system 44 according to an embodiment of the disclosure comprises a data emitting-receiving and power transmission device 46, and data emitting-receiving and power receiving device 48, a communication link 50 and a supplemental communication link 51.

The communication links 50, 51 connect the emitting-receiving device 46 to the emitting-receiving device 48. The communication links 50, 51 are for example made up of a first strand 50 and a second strand 51 of a controlled impedance cable. A RS-485 type cable or an ethernet cable can for example be used. The communication link 50 is isolated from the communication link 51. This isolation is shown materially in FIG. 2 by the capacitors 82, 84, 106 and 108.

The data emitting-receiving and power transmission device 46 comprises a processing unit 52, a data and power emitting unit 53 and a receiver 55 able to receive data.

The processing unit 52 is connected to the emitting unit 53 and to the receiver 55. The processing unit 52 comprises an output 58 suited for generating a signal representative of data to be transmitted to the emitting-receiving device 48 and an input 60 suited for receiving data emitted by the emitting-receiving device 48.

The processing unit 52 is made up of a protocol controller.

The emitting unit 53 is connected to the communication link 50 and to the supplemental communication link 51. It is able to emit the data coming from the processing unit over the communication links 50, 51.

The emitting unit 53 comprises a voltage-controlled oscillator 54, and an emitter 56 connected to the output 58 of the processing unit and to the oscillator 54.

The oscillator 54 is able to generate a fixed frequency carrier wave. This carrier wave is for example a square wave or sinusoid.

The emitter 56 is a conventional emitter used in a different way from the typical use thereof. Thus, the emitter 56 comprises an input 62 generally intended for receiving data to be transmitted, an activation input 64 generally provided for receiving an activation signal (commonly called "enabling signal") and at least two outputs 66, 68 one connected to the communication link 50 and the other the supplemental communication link 51. In the conventional operation thereof, the activation signal enables the operation of the emitter. Thus, in the conventional operation thereof, the emitter 56 operates when it receives the activation signal and no longer operates when it no longer receives the activation signal.

According to the present disclosure, the input 62 and the activation input 64 are redirected from their usual use. Thus, according to the disclosure, the input 62 is connected to the output of the oscillator 54 in order to receive the carrier wave. The activation input 64 is connected to the output 58 from the processing unit. The activation input 64 is thus suited for receiving the data to be transmitted to the emitting-receiving device 48. The emitter 56 is suited for modulating the carrier wave received at the input 62 by the signal received at the activation input 62. Thus, the emitter 56 is able to modulate the carrier wave by the signal representative of the data.

The emitter 56 is for example suited for implementing an on-off modulation ("On off Keying"). In this case the carrier wave is a square wave. When the carrier wave modulated by the signal representative of the data is present, it represents a logical signal equal to the value 0. When the carrier wave modulated by the signal representative of the data is absent, it represents a logical signal equal to the value 1.

The emitter 56 is able to send the modulated carrier wave in differential mode over the communication link 50 and over the supplemental communication link 51. The transmission according to a differential mode advantageously serves to reduce the electromagnetic disturbances generated during transmission of power and the modulated carrier wave over the communication links 50, 51 and increases the noise immunity on receiving.

The emitting unit 53 further comprises a power line 70 connected to the communication link 50 at a connection point 74 and a supplemental power line 72 connected to the supplemental communication link 51 at a supplemental connection point 76.

The emitting unit 53 can also comprise an aircraft voltage supply source 78 such as the aircraft generator or a battery. The power lines 70, 72 are connected to this supply source 78. The power line 70 is for example connected to a 28 V potential. The supplemental power line 72 is connected to the current return of the voltage supply source.

Advantageously, the emitting unit 53 comprises a filter 80 connected to the power line 70 upstream from the connection point 74 and to the power line 72 downstream from the connection point 76, with reference to the direction of the supply current coming from the supply source 78. In particular, the filter 80 is connected between this supply source 78 and the connection points 74, 76.

The filter 80 serves to block the alternating components from the signals traveling the power lines 70, 72 and thus prevents the modulated carrier wave from being transmitted to the supply source 80.

This filter 80 is for example made up of a transformer.

The emitting unit 53 further comprises a capacitive coupling component 82 connected between the output 66 of the emitter and the connection point 74, and a supplemental capacitive coupling component 84 connected between the supplemental output 68 of the emitter and the supplemental connection point 76.

The capacitive coupling components 82, 84 are suited for sending the modulated carrier wave and for blocking the supply voltage. In that way, the supply voltage applied by the supply source 78 is not transmitted to the emitter 56.

The capacitive coupling components 82, 84 are, for example, made up of one capacitor or of a set of capacitors.

The receiver 55 is connected to the communication links 50, 51. It comprises a conversion unit 86 and a filtering and comparison unit 88.

The conversion unit 86 comprises an input 87 connected to the communication link 50 between the input 66 and the capacitive coupling component 82, and an input 89 connected to the supplemental communication link 51 between the supplemental input 68 and the supplemental capacitive coupling component 84.

Advantageously, the capacitive coupling components 82, 84 block the supply voltage so that it is not transmitted to the receiver 55.

The conversion unit 86 is suited for converting the signals transmitted on the communication links 50, 51 from a differential transmission mode to a non-differential transmission mode. This conversion is done conventionally by subtraction of the transmitted signals from each communication link.

The filtering and comparison unit 88 is connected to the conversion unit 86 and to the input 60 of the processing unit 52. It is able to reject unwanted frequencies (noise) and to deliver a signal to the processing unit 52 with voltage levels compatible therewith.

The data emitting-receiving and power receiving device 48 comprises a data and power receiving unit 90, a data emitting unit 92 and a processing unit 52.

The receiving unit 90 is able to receive data and power coming from the emitting device 46. The receiving unit 90 is connected to the communication links 50, 51 and to the processing unit 52.

The receiving unit 90 comprises a power line 94 connected to the communication link 50 at a connection point 96 and a supplemental communication line 98 connected to the supplemental communication link 51 at a supplemental connection point 100.

The receiving unit 90 can also comprise equipment 102 connected to the power line 94 and to the supplemental power line 98. The equipment 102 comprises one or more units of electrical equipment.

Preferably, the receiving unit 90 comprises a filter 104 connected to the power line 94 downstream from the connection point 96 and to the power line 96 upstream from the connection point 100, with reference to the direction of the current coming from the supply source 78 and feeding the equipment 102. In particular, the filter 104 is connected between the equipment 102 and the connection points 96 and 100. This filter is suited for blocking the alternating component of the signal sent by the communication links 50, 51 and allows the direct component pass. Thus, the filter 104 is suited for allowing the supply voltage to pass and blocking the modulated carrier wave. The filter 104 is for example made up of a transformer.

The receiving unit 90 further comprises a conversion unit 86 and a filtering and comparison unit 88 identical to the conversion unit 86 and respectively to the filtering and comparison unit 88 of the receiver 55.

In particular, the conversion unit 86 comprises an input 87 connected to the communication link 50 and an input 89 connected to the supplemental communication link 51. The conversion unit 86 is able to receive a carrier wave modulated by a signal representative of the data. The filtering and comparison unit 88 is connected between the conversion unit 86 and the processing unit 52.

Conversion unit 86 and the filtering and comparison unit 88 form a receiver.

The receiving unit 90 further comprises a capacitive coupling component 106 connected between the connection point 96 and the input 87 of the conversion unit, and a supplemental capacitive coupling component 108 connected between the connection point 100 and the input 89 of the conversion unit.

The capacitive coupling components 106, 108 are suited for blocking the direct component of the signal transmitted by the communication links 50, 51 and sending the alternating component. Thus the capacitive coupling components 106, 108 are able to block the supply voltage coming from the voltage source 78 and to let the modulated carrier wave pass. The capacitive coupling components 106, 108 comprise one or more capacitors.

The emitting unit 92 is connected to the communication links 50, 51 and to the processing unit 52. The emitting unit 92 comprises an oscillator 54 and an emitter 56 connected to the oscillator 54.

The oscillator 54 and the emitter 56 of the emitting unit 92 are identical, connected in the same way and are suited to operate in the same way as the oscillator 54 and the emitter 56 of the emitting unit 53.

Similarly, the processing unit 52 of the emitting-receiving device 48 is identical to the processing unit 52 of the emitting-receiving device 46 and will not be described again.

According to a variant, the emitting-receiving device 46 comprises two voltage-controlled oscillators suited for generating carrier waves having different frequencies. The emitter 56 is connected to the two oscillators. The emitter 56 is suited for generating a wave modulated by the signal representative of the data for a logical signal equal to the value 0 and a carrier wave having a different frequency for a logical signal equal to the value 1.

According to a less advantageous variant, the emitting-receiving device 46 comprises a single communication link, and the emitter 56 comprises a single output 66 suited for transmitting the modulated carrier wave over the single communication link in a non-differential mode.

As a variant, the system does not comprise the one or two filters 80 and 104. In this case, a portion of the modulated carrier is sent towards the supply source 78 or towards the electrical equipment 102. This does not interfere with the operation of the system.

As a variant, the equipment 102 is connected to the emitting-receiving device 46 and the voltage supply 78 is connected to the emitting-receiving device 48. In this case, it is the emitting-receiving device 48 which supplies the emitting-receiving device 46 with voltage, since the data are sent from the emitting-receiving device 46 to the emitting-receiving device 48 and vice versa.

In operation, the emitter 56 modulates the data coming from the processing unit 52 onto the carrier generated by the oscillator 54 and sends them over the communication links 50, 51. The data are thus transmitted from the emitting-receiving device 46 to the emitting-receiving device 48 and vice versa. The data received are processed by conversion units 86 and filtering and comparison units 88. In parallel, the power source 78 supplies voltage to all of the equipment 102.

Advantageously, the modulation done by the emitters 56 of emission-receiving devices 46 and 48 retains the functionality of dominant and recessive bits and allows the transmission of power.

Figure 3:
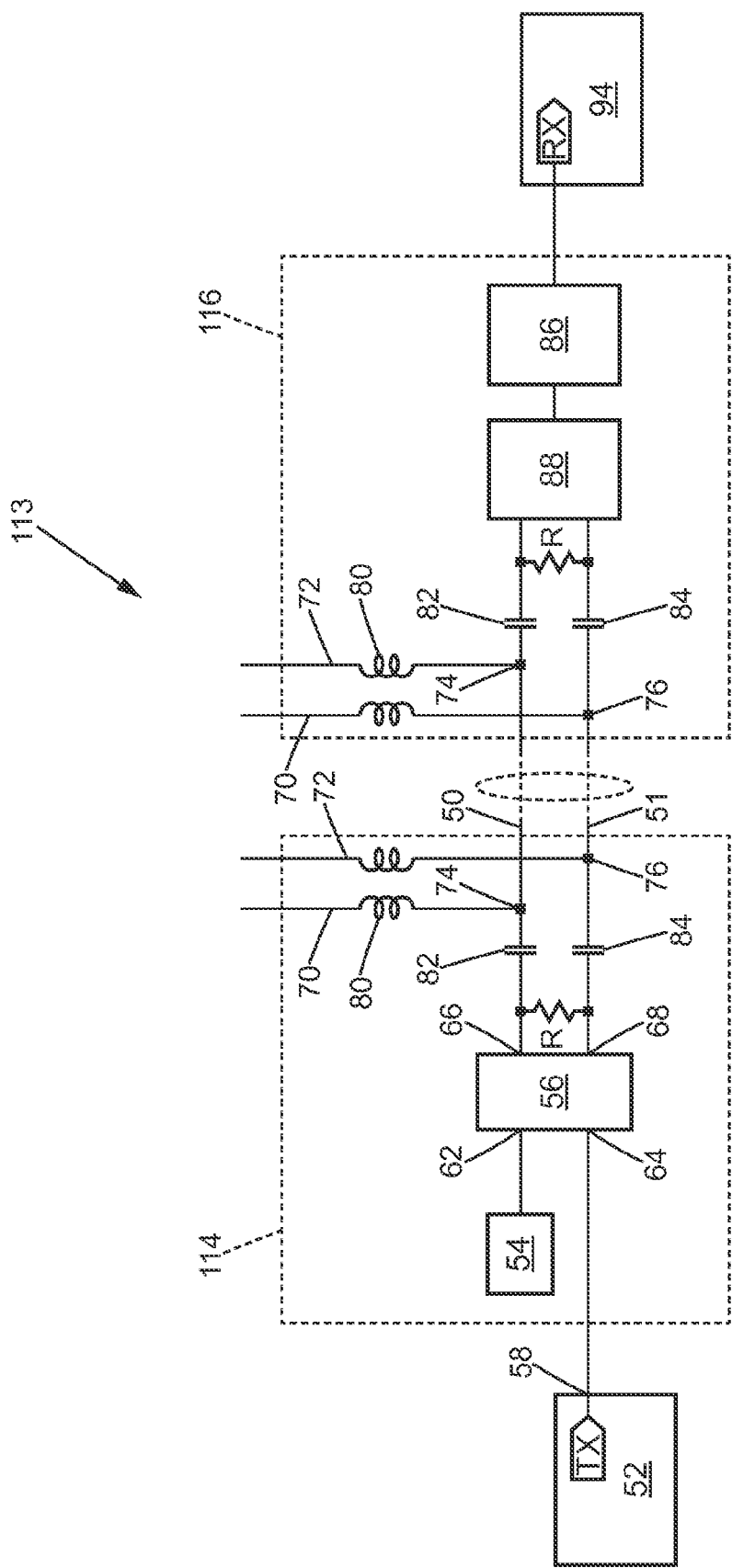
FIG. 3 is a schematic view of a data and power transmission system according to a second embodiment of the disclosure.

FIG. 3 shows a transmission system 113 according to a second embodiment of the disclosure. The transmission system 113 is identical or similar to the transmission system 44 according to the first embodiment except for the fact that the emitting-receiving device 46 is replaced by an emitting device 114 which does not comprise a receiver 55 and the processing unit 52 does not comprise an input 60.

Similarly, the emitting-receiving device 48 is replaced by a receiving device 116 which does not comprise an emitting unit 92 and the processing unit 94 does not comprise an output able to transmit data to the emitter 110. The components of the transmission system 113 identical or similar to the components of the transmission system 44 have the same reference and are not described again.

In operation, the emitting device 114 emits data and transmits a supply voltage to the receiving device 116. The receiving device receives the data and the supply voltage.

Obviously, the disclosure is not limited to the embodiments previously described and provided solely as examples. It encompasses various modifications, alternative forms and other variance which the person skilled in the art could conceive in the context of the present disclosure and in particular any combinations of the various operating modes previously described, which can be taken separately or in combination.

The invention claimed is:

1. An emitting device configured to emit data, said emitting device comprising:
   an oscillator configured for generating at least one carrier wave;
   an emitter comprising:
   at least one input connected to the oscillator;
   an activation input to receive an activation signal; wherein the activation input is configured for receiving a signal representative of data to be transmitted;
   at least one output configured to generate a carrier wave modulated by the signal representative of the data to be transmitted, and
   a supplemental output;
   a communication link connected to the output of the emitter;
   a voltage supply source connected to the power line;
   at least one power line connected to the communication link at a connection point;
   at least one capacitive coupling component connected between the output of the emitter and the connection point, the capacitive coupling component being configured for sending the modulated carrier wave and blocking the transmission of the supply voltage;
   a supplemental communication link connected to the supplemental output;
   a supplemental power line connected to the supplemental communication link at a supplemental connection point; and
   a transformer connected to the power line and the supplemental power line between on one side the voltage supply source and, on the other side the connection point and the supplemental connection point, said transformer configured for blocking the transmission of the modulated carrier wave.

2. The emitting device according to claim 1 comprising at least one supplemental capacitive coupling component connected between the supplemental output of the emitter and the supplemental connection point.

3. The emitting device according to claim 1, wherein the emitter is configured for generating the modulated carrier wave in a differential mode at the output and at the supplemental output.

4. The emitting device according to claim 1, further comprising a processing unit having an output configured for generating a signal representative of data to be transmitted, wherein said output is connected to the activation input of the emitter.

5. The emitting device according to claim 1, further comprising electrical equipment connected to the power line.

6. A system for data and power transmission comprising an emitting device according to claim 1 and a receiving device comprising a receiver comprising an input connected to the communication link, wherein the receiver is configured for receiving a carrier wave modulated by a signal representative of data;
   at least one power line connected to the communication link at a connection point; and
   at least one capacitive coupling component connected between the input of the receiver and the connection point, wherein said capacitive coupling component is configured for sending the modulated carrier wave and blocking the transmission of the supply voltage.

7. A receiving device configured to receive data, said receiving device comprising:
   a receiver comprising:
   an input configured for receiving a carrier wave modulated by a signal representative of data; and
   a supplemental input;

a communication link connected to the input of the receiver, wherein the communication link is intended to be brought to a supply voltage and to transmit the modulated carrier wave;

at least one power line connected to the communication link at a connection point;

at least one capacitive coupling component connected between the input of the receiver and the connection point, wherein said capacitive coupling component is configured to send the modulated carrier wave and to block the transmission of the supply voltage;

an electrical equipment connected to the power line;

a supplemental communication link connected to the supplemental input;

a supplemental power line connected to the supplemental communication link at a supplemental connection point;

at least one supplemental capacitive coupling component connected between the supplemental input of the receiver and the supplemental connection point, wherein said supplemental capacitive coupling component is configured to send the modulated carrier wave and to block the transmission of the supply voltage; and a transformer connected to the power line and the supplemental power line, said transformer being connected between on one side, the electrical equipment and on the other side, the connection point and the supplemental connection point, said transformer configured for blocking the transmission of the modulated carrier wave.

8. The receiving device according to claim 7, further comprising a voltage supply source connected to the power line.

* * * * *